(12) United States Patent
Tamaki et al.

(10) Patent No.: US 11,471,958 B2
(45) Date of Patent: Oct. 18, 2022

(54) END MILL AND MACHINING METHOD

(71) Applicant: MOLDINO Tool Engineering, Ltd., Tokyo (JP)

(72) Inventors: Kenshiroh Tamaki, Yasu (JP); Mitsuhiro Yokokawa, Yasu (JP)

(73) Assignee: MOLDINO Tool Engineering, Ltd., Tokyo (JP)

( * ) Notice: Subject to any disclaimer, the term of this patent is extended or adjusted under 35 U.S.C. 154(b) by 36 days.

(21) Appl. No.: 16/965,699

(22) PCT Filed: Jan. 28, 2019

(86) PCT No.: PCT/JP2019/002632
§ 371 (c)(1),
(2) Date: Jul. 29, 2020

(87) PCT Pub. No.: WO2019/151169
PCT Pub. Date: Aug. 8, 2019

(65) Prior Publication Data
US 2020/0353544 A1 Nov. 12, 2020

(30) Foreign Application Priority Data

Feb. 2, 2018 (JP) .............................. JP2018-017384

(51) Int. Cl.
*B23C 5/10* (2006.01)
*B23C 3/00* (2006.01)
*B23C 9/00* (2006.01)

(52) U.S. Cl.
CPC ............... *B23C 5/10* (2013.01); *B23C 3/00* (2013.01); *B23C 9/00* (2013.01); *B23C 2210/0407* (2013.01); *B23C 2210/207* (2013.01)

(58) Field of Classification Search
CPC .... B23C 2210/0407; B23C 2210/0435; B23C 2210/207; B23C 3/00; B23C 5/10; B23C 9/00
See application file for complete search history.

(56) References Cited

U.S. PATENT DOCUMENTS

| 3,217,382 | A | * | 11/1965 | De Dobbelaere | B23D 71/00 407/29.13 |
| 5,049,009 | A | * | 9/1991 | Beck | B23C 5/10 407/54 |
| 5,176,476 | A | * | 1/1993 | Duffy | B23C 5/10 407/61 |
| 6,749,375 | B2 | * | 6/2004 | Thomas | B23C 5/10 407/53 |

(Continued)

FOREIGN PATENT DOCUMENTS

| CN | 101983811 A | 3/2011 |
| CN | 106794526 A | 5/2017 |

(Continued)

OTHER PUBLICATIONS

JP-09300119-A Machine Translation, pp. 3-4 (Year: 2022).*

(Continued)

*Primary Examiner* — Nicole N Ramos
(74) *Attorney, Agent, or Firm* — Locke Lord LLP

(57) ABSTRACT

In an end mill, eight peripheral cutting edges having a helical shape and a larger outer diameter than that of a shaft portion are in a cutting portion in a circumferential direction. For one peripheral cutting edge of the eight peripheral cutting edges, when a cut length of the peripheral cutting edge along an axial direction is L, a twist angle of the peripheral cutting edge is θ, and a circumferential distance at a lower end of the peripheral cutting edge between the peripheral cutting edge and another peripheral cutting edge adjacent to a tool rotation direction rear side of the peripheral cutting edge is a, n expressed by the following equation is approximately 1 for all of the eight peripheral cutting edges in at least a half region of the cut length from the lower end of the peripheral cutting edge.

$n = (L \times \tan\theta)/(2 \times a)$

12 Claims, 8 Drawing Sheets

(56) References Cited

U.S. PATENT DOCUMENTS

| | | | |
|---|---|---|---|
| 9,555,486 B2* | 1/2017 | Baba | B23C 5/10 |
| 9,884,379 B1* | 2/2018 | Budda | B23C 5/10 |
| 2002/0067964 A1* | 6/2002 | Sekiguchi | B23C 5/10 407/63 |
| 2004/0120777 A1* | 6/2004 | Noland | B23C 5/10 407/63 |
| 2006/0067797 A1* | 3/2006 | Calamia | B23C 5/10 407/53 |
| 2007/0297864 A1* | 12/2007 | de Boer | B23C 5/10 407/54 |
| 2010/0215447 A1* | 8/2010 | Davis | B23C 5/10 407/115 |
| 2011/0217132 A1* | 9/2011 | Wells | B23P 15/34 407/54 |
| 2012/0039677 A1* | 2/2012 | Davis | B23C 5/10 407/54 |
| 2015/0174672 A1 | 6/2015 | Baba et al. | |
| 2015/0290724 A1* | 10/2015 | Sharivker | B21H 3/10 407/54 |
| 2016/0089728 A1* | 3/2016 | Archambault | B23C 5/10 407/54 |
| 2016/0297012 A1* | 10/2016 | Davis | B23C 5/10 |
| 2019/0160561 A1* | 5/2019 | Xu | B23C 5/1009 |
| 2019/0299304 A1* | 10/2019 | Jia | B23C 5/165 |

FOREIGN PATENT DOCUMENTS

| | | | | |
|---|---|---|---|---|
| EP | 0155216 A1 * | 9/1985 | | B23B 51/02 |
| GB | 2487303 A * | 7/2012 | | B23C 5/10 |
| JP | 02180517 A * | 7/1990 | | B23C 5/10 |
| JP | H04-304918 A | 10/1992 | | |
| JP | H06-031519 A | 2/1994 | | |
| JP | 08112712 A * | 5/1996 | | B23C 5/10 |
| JP | 09300119 A * | 11/1997 | | B23C 5/10 |
| JP | 2000-334615 A | 12/2000 | | |
| JP | 2001287114 A * | 10/2001 | | B23C 5/10 |
| JP | 2003-260607 A | 9/2003 | | |
| JP | 2004-034171 A | 2/2004 | | |
| JP | 2006-231504 A | 9/2006 | | |
| JP | 2007-030074 A | 2/2007 | | |
| JP | 2009-056533 A | 3/2009 | | |
| JP | 2010-120099 A | 6/2010 | | |
| JP | 2015-533666 A | 11/2015 | | |
| JP | 2016-159379 A | 9/2016 | | |
| WO | 2014/017576 A1 | 1/2014 | | |
| WO | 2014/076691 A1 | 5/2014 | | |

OTHER PUBLICATIONS

Notice of Allowance dated Feb. 25, 2020, issued for Japanese Patent Application No. 2019-563113 and English translation thereof.

International Search Report dated Mar. 19, 2019, issued for PCT/JP2019/002632 and English translation thereof.

Supplementary European Search Report dated Oct. 6, 2021, issued for European Patent Application No. 19748307.6.

Office Action dated Aug. 11, 2022, issued for Chinese Patent Application No. 201980010914.7 and English translation of Search Report.

* cited by examiner

END MILL AND MACHINING METHOD

TECHNICAL FIELD

The present invention relates to an end mill and a machining method using the end mill.

Priority is claimed on Japanese Patent Application No. 2018-017384, filed Feb. 2, 2018, the content of which is incorporated herein by reference.

BACKGROUND ART

When a deep vertical wall (90° wall) is cut in die machining, in a case where an end mill having a long cut length is used, the rigidity of the end mill is insufficient, so that the machining accuracy is reduced. For this reason, in the machining of the vertical wall, contour machining where an end mill having a short cut length is used to perform cutting in multiple stages in a direction perpendicular to an axis while moving in a stepwise manner in an axial direction is proposed (For example, Patent Document 1).

CITATION LIST

Patent Literature

[Patent Document 1]
Japanese Unexamined Patent Application, First Publication No. 2000-334615

SUMMARY OF INVENTION

Technical Problem

In the contour machining of the vertical wall, when a cut depth in a depth direction is set to be the entire length of a peripheral cutting edge, the tool is likely to be deflected during machining and the machining accuracy is likely to be reduced. For this reason, in order to obtain a high-accuracy finished surface quality, zero cutting is repeatedly performed many times, so that it takes the time to complete the machining. As a result, the machining cost is increased, which is a problem. In addition, when the cut depth is reduced, machining is performed while the end mill is moved many times in the axial direction, so that it takes the time to complete the machining. As a result, the machining cost is increased.

The present invention has been made in light of such circumstances, and one object of the present invention is to provide an end mill that is used in contour machining to be able to reduce zero cutting in a finishing process and improve the machining accuracy.

Solution to Problem

According to one aspect of the present invention, there is provided an end mill including: a shaft portion having a columnar shape and extending along a central axis; and a cutting portion positioned on a distal end side of the shaft portion. Eight peripheral cutting edges having a larger outer diameter than that of the shaft portion are provided in the cutting portion in a circumferential direction. The peripheral cutting edge is a twisted cutting edge extending helically around the central axis. In regard to one peripheral cutting edge of the eight peripheral cutting edges, when a cut length of the peripheral cutting edge along an axial direction is L, a twist angle of the peripheral cutting edge is $\theta$, and a circumferential distance at a lower end of the peripheral cutting edge between the peripheral cutting edge and another peripheral cutting edge adjacent to a tool rotation direction rear side of the peripheral cutting edge is a, n expressed by the following equation is approximately 1 for all of the eight peripheral cutting edges in at least a half region of the cut length from the lower end of the peripheral cutting edge.

$$n = (L \times \tan \theta)/(2 \times a)$$

The end mill of the present invention adopts a configuration where good tool performance is reproduced when a cut depth in a depth direction is shorter than the entire length of the peripheral cutting edge. Specifically, in this configuration, an especially good tool performance is reproduced in contour machining where the cut depth in the depth direction is half the entire length of the peripheral cutting edge. The n expressed by the foregoing equation indicates the number of the peripheral cutting edges, which always are in contact with a workpiece during the cutting of the workpiece by the end mill, in a lower half region of the peripheral cutting edge. According to the foregoing configuration, during cutting, approximately one peripheral cutting edge always is in contact with the workpiece in the lower half region of the peripheral cutting edge (the number of simultaneous contact cutting edges always is approximately 1 in the lower half region). During the cutting of the workpiece by the end mill, when the number of the simultaneous contact cutting edges increases or decreases, the cutting resistance which the end mill receives from the workpiece increases or decreases. Accordingly, the end mill vibrates to cause a reduction in machining accuracy, which is a problem. Since the lower half region of the peripheral cutting edge has a large machining allowance, when the number of the simultaneous contact cutting edges increases or decreases, the vibration of the end mill is more likely to be amplified. In addition, also when the number of the simultaneous contact cutting edges always is a natural number of two or greater in the lower half region of the peripheral cutting edge, the machining accuracy is further reduced compared to when the number of the simultaneous contact cutting edges always is approximately 1. Since the number of the simultaneous contact cutting edges always is approximately 1 in the lower half region of the peripheral cutting edge in which the machining allowance is large, the bending of the tool is less likely to occur during machining, and the vibration of the end mill is inhibited. Therefore, it is possible to improve the machining accuracy of a machined surface.

In addition, it is possible to secure a long cut length of the peripheral cutting edge in the axial direction while satisfying the foregoing configuration, and it is possible to perform machining over a wide range in one step when the contour machining is performed. As a result, it is possible to reduce the machining cost.

In addition, according to the foregoing configuration, the eight peripheral cutting edges are provided. When the number of the simultaneous contact cutting edges always is approximately 1 in the lower half region of the peripheral cutting edge and the number of the peripheral cutting edges is increased, it is possible to inhibit the margin of an increase or a decrease in cutting resistance when the peripheral cutting edge in contact with the workpiece is changed. Since the eight peripheral cutting edges are provided, it is possible to reduce the margin of an increase or a decrease in cutting resistance, and to inhibit the vibration of the end mill during cutting. As a result, it is possible to improve the machining accuracy.

In addition, in the end mill, the n may be from 0.9 to 1.1.

As described above, when the number of the simultaneous contact cutting edges always is approximately 1 in the lower half region of the peripheral cutting edge (namely, n≈1), it is possible to improve the machining accuracy of the machined surface. On the other hand, when the n exceeds 1.1 or when the n is less than 0.9, the vibration of the end mill during machining adversely affects the machining accuracy, and it is difficult to form the machined surface with sufficient machining accuracy. Namely, according to the foregoing configuration, it is possible to sufficiently improve the machining accuracy of the machined surface. Then is more preferably from 0.95 to 1.05.

In addition, in the end mill, m expressed by the following equation may be approximately 2 for all of the eight peripheral cutting edges in the entire length of the peripheral cutting edge.

$$m=(L\times\tan\theta)/a$$

The m expressed by the foregoing equation indicates the number of the peripheral cutting edges, which always are in contact with the workpiece during the cutting of the workpiece by the end mill, over the entire length of the peripheral cutting edge. According to the foregoing configuration, in contour machining where the cut depth in the depth direction is set to be half the entire length of the peripheral cutting edge, a machined surface is mainly formed in the lower half region of the cut length, and then while a new surface is machined in the lower half region, the upper half region of the cut length is deflected and the region machined in the lower half region of the cut length is machined again in the upper half region of the cut length. In contour machining using an end mill in the related art, a very small step is formed in a boundary portion of a cut in the depth direction due to the bending of the end mill. According to the foregoing configuration, the cut length and the simultaneous contact cutting edges can be aligned and the region machined in the lower half of the cut length can be machined in the upper half of the cut length in the next cut. In other words, the surface initially machined in the lower half of the cut length can machined in the next cut in the upper half region of the cut length in which the number of the simultaneous contact cutting edges is approximately 1. For this reason, it is possible to further improve the machining accuracy of the machined surface, and it is also possible to further reduce the step formed in the boundary portion of the cut in the depth direction.

In addition, in the end mill, the m may be from 1.9 to 2.1.

As described above, when the number of the simultaneous contact cutting edges always is approximately 2 over the entire length of the peripheral cutting edge (namely, m≈2), it is possible to improve the machining accuracy of the machined surface. On the other hand, when the m exceeds 2.1 or when the m is less than 1.9, the vibration of the end mill during machining adversely affects the machining accuracy, and it is difficult to form the machined surface with sufficient machining accuracy. Namely, according to the foregoing configuration, it is possible to sufficiently improve the machining accuracy of the machined surface. The m is more preferably from 1.95 to 2.05.

In addition, in the end mill, an outer diameter D of the peripheral cutting edge is preferably 4 mm or greater.

When the outer diameter of the peripheral cutting edge is small, it is difficult to form eight cutting edges. For this reason, in the end mill of the present embodiment which is assumed to include eight cutting edges, the outer diameter of the peripheral cutting edge is preferably 4 mm or greater.

Furthermore, the outer diameter of the peripheral cutting edge is preferably 5 mm or greater. In addition, when the outer diameter is too large, it is difficult to produce a solid end mill. For this reason, the outer diameter of the peripheral cutting edge is preferably 30 mm or less.

In the end mill, the twist angle is preferably from 35° to 40°.

According to the foregoing configuration, when the twist angle of the peripheral cutting edge is from 35° to 40°, in the end mill including the eight peripheral cutting edges in which the simultaneous contact cutting edges always is approximately 1 in the lower half region of the peripheral cutting edge, the peripheral cutting edge is configured such that the cut length is not too long. Therefore, the rigidity of the tool is increased and the bending of the tool is less likely to occur during machining. Accordingly, it is possible to sufficiently improve the machining accuracy of the machined surface without performing zero cutting. Furthermore, the twist angle of the peripheral cutting edge is preferably from 37° to 39°.

In the end mill, the peripheral cutting edge may include a positive rake face.

According to the foregoing configuration, since the peripheral cutting edge includes the positive rake face, the sharpness of the peripheral cutting edge is further improved compared to when the peripheral cutting edge includes a negative rake face. Accordingly, it is possible to sufficiently improve the machining accuracy of the machined surface without performing zero cutting.

In the end mill, the peripheral cutting edge may include a two-stage flank face.

According to the foregoing configuration, even when the feed amount of the end mill is increased, it is possible to further improve the accuracy of the machined surface compared to when the flank face is one stage. Accordingly, it is possible to sufficiently improve the machining accuracy of the machined surface without performing zero cutting.

According to another aspect of the present invention, there is provided a machining method using the foregoing end mill, including: performing contour machining in a state where a cut depth in a depth direction is set to be half the cut length.

According to the foregoing configuration, it is possible to improve the machining accuracy without performing zero cutting.

Advantageous Effects of Invention

According to the present invention, it is possible to provide the end mill that is used in contour machining to be able to reduce zero cutting for obtaining the dimensional accuracy and improve the machining accuracy.

DESCRIPTION OF EMBODIMENTS

Figure 1:
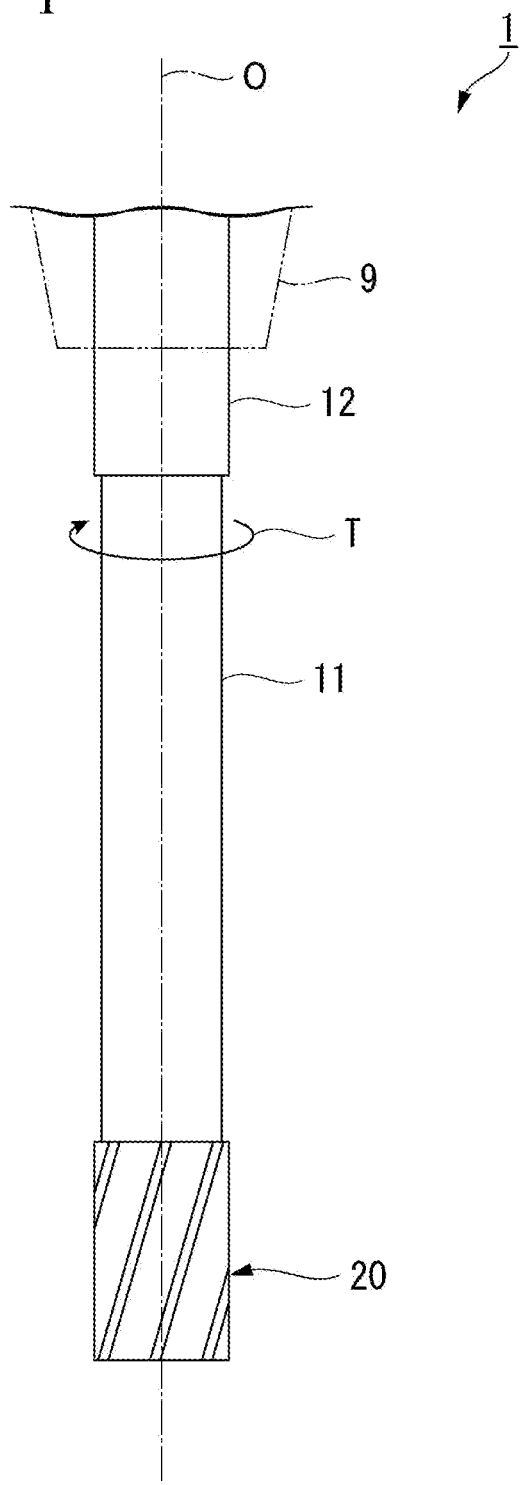
FIG. 1 is a schematic view of an end mill according to an embodiment.

Hereinafter, an embodiment to which the present invention is applied will be described in detail with reference to the drawings. Incidentally, in the drawings referenced in the following description, in order to facilitate the understanding of featured portions, featureless portions may not be shown for the sake of convenience.

Figure 2:
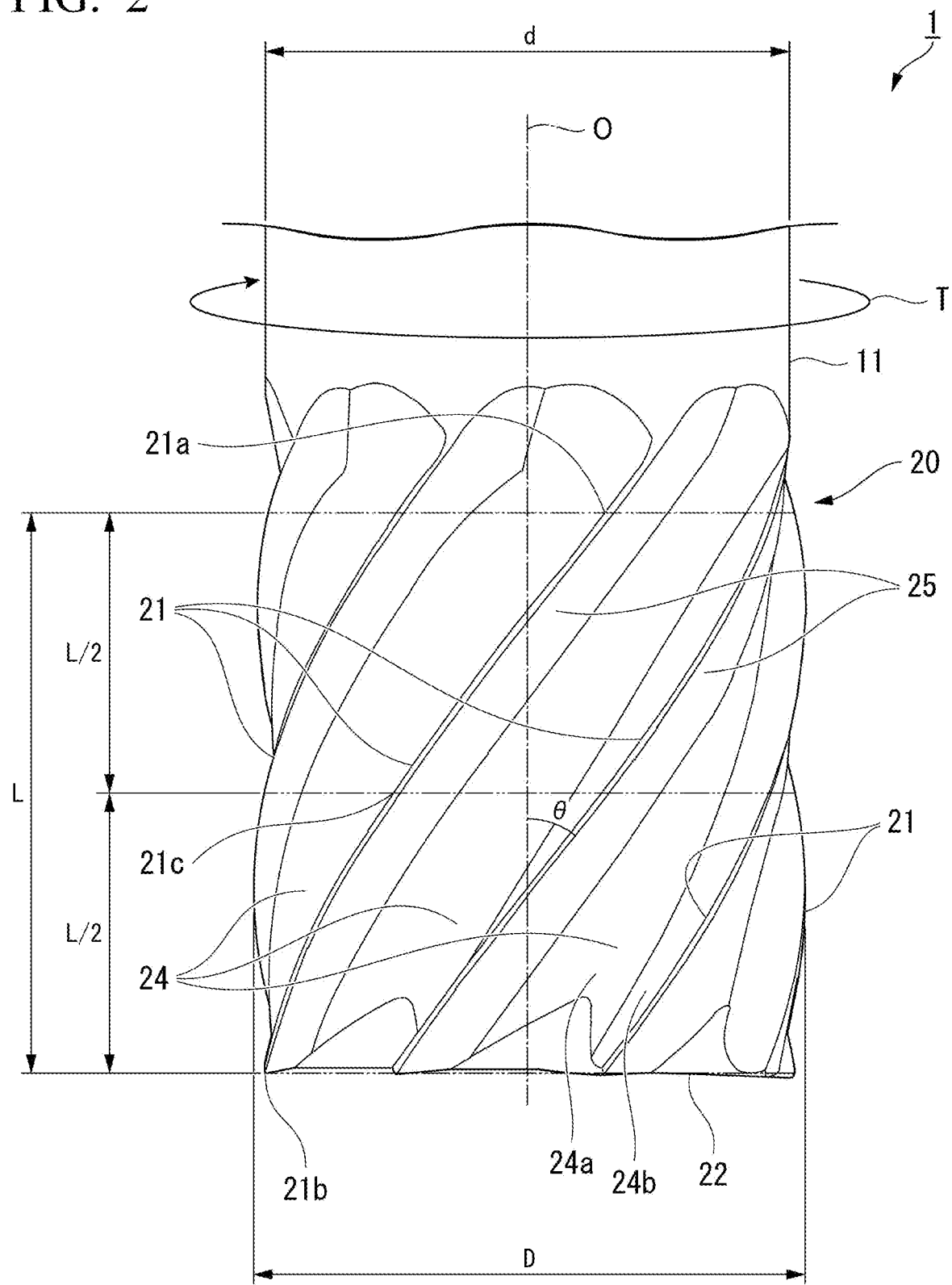
FIG. 2 is a front view of a cutting portion of the end mill according to the embodiment.
Figure 3:
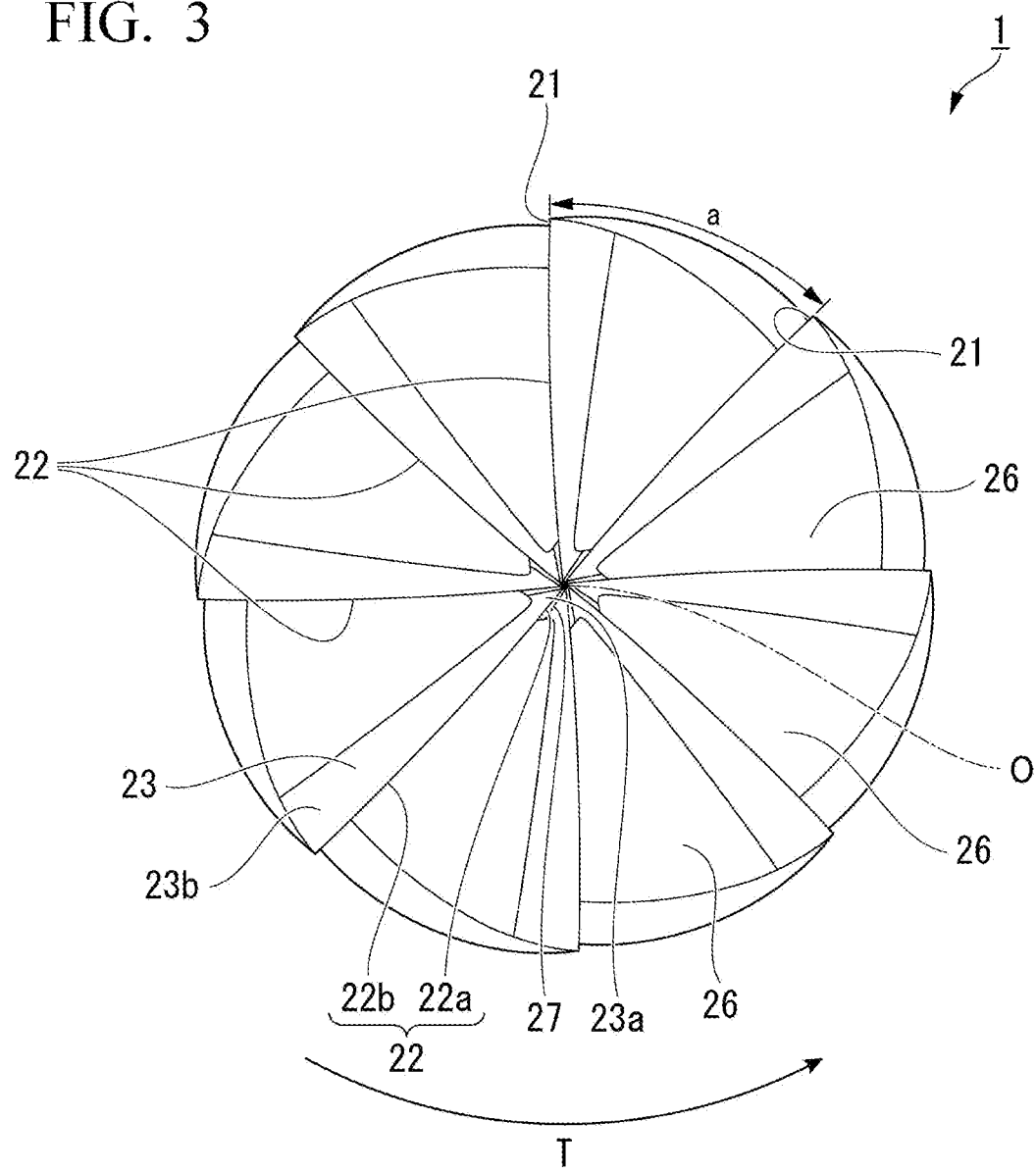
FIG. 3 is a plan view of the cutting portion of the end mill according to the embodiment.

FIG. 1 is a schematic view of an end mill 1 according to one embodiment. FIG. 2 is a front view of a cutting portion 20 of the end mill 1. FIG. 3 is a plan view of the cutting portion 20 of the end mill 1.

As shown in FIG. 1, the end mill 1 is a substantially columnar bar extending along an axial direction around an axis (central axis) O. The end mill 1 is made of a hard material such as a cemented carbide.

In this specification, a direction parallel to the axis O of the end mill 1 is simply referred to as the axial direction. In addition, a direction orthogonal to the axis O is referred to as a radial direction. In addition, a direction circling around the axis O is referred to as a circumferential direction. In the circumferential direction, the direction of rotation of the end mill 1 during cutting is referred to as tool rotation direction T. In addition, in the following description, a region on a tool rotation direction T side with respect to a specific portion may be referred to as a rotation direction front side, and a region opposite to the tool rotation direction T side may be referred to as a rotation direction rear side.

The end mill 1 of the present embodiment is a square end mill. The end mill 1 machines a vertical wall using contour machining. A workpiece machined by the end mill 1 is, for example, a mold insert for resin molding.

The end mill 1 includes a shank portion 12, a neck portion (shaft portion) 11, and the cutting portion 20. The shank portion 12, the neck portion 11, and the cutting portion 20 are arranged in order from a proximal end side toward a distal end side along the axis O.

The shank portion 12 has a columnar shape extending along the axis O. The shank portion 12 is gripped by a machine tool 9. The end mill 1 is rotated around the axis O in the tool rotation direction T in a state where the shank portion 12 is gripped by the machine tool 9. The end mill 1 is used to cut (rotary cut) a workpiece such as a metal material. In addition, the end mill 1 is rotated around the axis O and is fed in a direction intersecting the axis O by the machine tool 9 to machine the workpiece.

The neck portion 11 has a columnar shape extending along the axis O. The neck portion 11 is positioned on a distal end side of the shank portion 12. In the present embodiment, the outer diameter of the neck portion 11 is smaller than the outer diameter of the shank portion 12. The neck portion 11 is a region facing a machined surface that is formed by contour machining using the end mill 1.

As shown in FIGS. 2 and 3, the cutting portion 20 is positioned on a distal end side of the neck portion 11. The cutting portion 20 is provided with eight peripheral cutting edges 21 and eight bottom cutting edges 22 that are connected to the peripheral cutting edges 21 on distal end (lower end) sides of the peripheral cutting edges 21.

The eight peripheral cutting edges 21 are disposed at equal intervals along the circumferential direction on a periphery of the cutting portion 20. In addition, the eight bottom cutting edges 22 are disposed at equal intervals along the circumferential direction at a distal end of the cutting portion 20.

As shown in FIG. 3, in the end mill 1 of the present embodiment, gashes 26 are provided between the eight bottom cutting edges 22. In addition, each of the eight bottom cutting edges 22 includes a central cutting edge 22a extending from the vicinity of the axis O toward the periphery side in the radial direction, and a main bottom cutting edge 22b that is positioned outward of the central cutting edge 22a in the radial direction and continuously extends outward from the central cutting edge 22a in the radial direction. A central cutting edge second face 23a is provided on a rotation direction rear side of the central cutting edge 22a. In addition, a main bottom cutting edge second face 23b is provided on a rotation direction rear side of the main bottom cutting edge 22b. The central cutting edge second face 23a and the main bottom cutting edge second face 23b are continuously formed in the radial direction. The central cutting edge second face 23a and the main bottom cutting edge second face 23b forms a flank face 23 of the bottom cutting edge 22.

The circumferential width of the main bottom cutting edge second face 23b gradually decreases toward a radial inner side. The circumferential width of a radial inner end of the main bottom cutting edge second face 23b is narrower than the circumferential width of a radial outer end of the central cutting edge second face 23a. The circumferential width of the central cutting edge second face 23a gradually decreases toward the radial inner side.

A central groove 27 continuous with the gash 26 is provided in a boundary portion between the central cutting edge 22a and the central cutting edge second face 23a positioned on a rotation direction front side of the central cutting edge 22a. The central groove 27 reaches the axis O on the radial inner side. According to the present embodiment, even though the central groove 27 is formed on the rotation direction front side of the central cutting edge 22a, fine chips present in the gash 26 can be less likely to enter the central groove 27.

As shown in FIG. 2, the peripheral cutting edge 21 is a twisted cutting edge extending helically around the axis O. The peripheral cutting edge 21 is helically twisted at a constant twist angle θ in the tool rotation direction T from the proximal end side toward the distal end side of the end mill 1. In the present embodiment, the twist angles θ of the eight peripheral cutting edges 21 are the same angle. Namely, the peripheral cutting edges 21 of the present embodiment have an equal lead.

An outer diameter D of the peripheral cutting edge 21 is smaller than an outer diameter d of the neck portion 11.

Accordingly, the neck portion 11 is inhibited from interfering with a machined surface formed by contour machining.

A chip discharge groove 24 is formed between the peripheral cutting edges 21. A plurality of the chip discharge grooves 24 are formed at equal intervals in the circumferential direction. The chip discharge groove 24 is helically twisted at a constant twist angle along the axial direction. The twist angle of the chip discharge groove 24 is equal to the twist angle O of the peripheral cutting edge 21. The chip discharge groove 24 is cut up to a periphery of the end mill 1 in an end portion on a proximal end side of the cutting portion 20.

The peripheral cutting edge 21 is formed at an end edge on a rotation direction rear side of the chip discharge groove 24. Namely, the chip discharge groove 24 is positioned on a rotation direction front side of the peripheral cutting edge 21. A wall face of the chip discharge groove 24 includes a bottom face 24a and a rake face 24b. The bottom face 24a is a face of the chip discharge groove 24, which faces outward in the radial direction with respect to the axis O. In addition, the rake face 24b is a wall face of the chip discharge groove 24, which faces the tool rotation direction T.

The peripheral cutting edge 21 is formed in a peripheral surface of the cutting portion 20 along a ridge line where the rake face 24b and a flank face 25 intersect each other. The flank face 25 is a face adjacent to the rotation direction rear side with respect to the chip discharge groove 24. The flank face 25 continuously extends in the circumferential direction on a rotation direction rear side of the peripheral cutting edge 21 from the peripheral cutting edge 21 toward the chip discharge groove 24.

Figure 4:
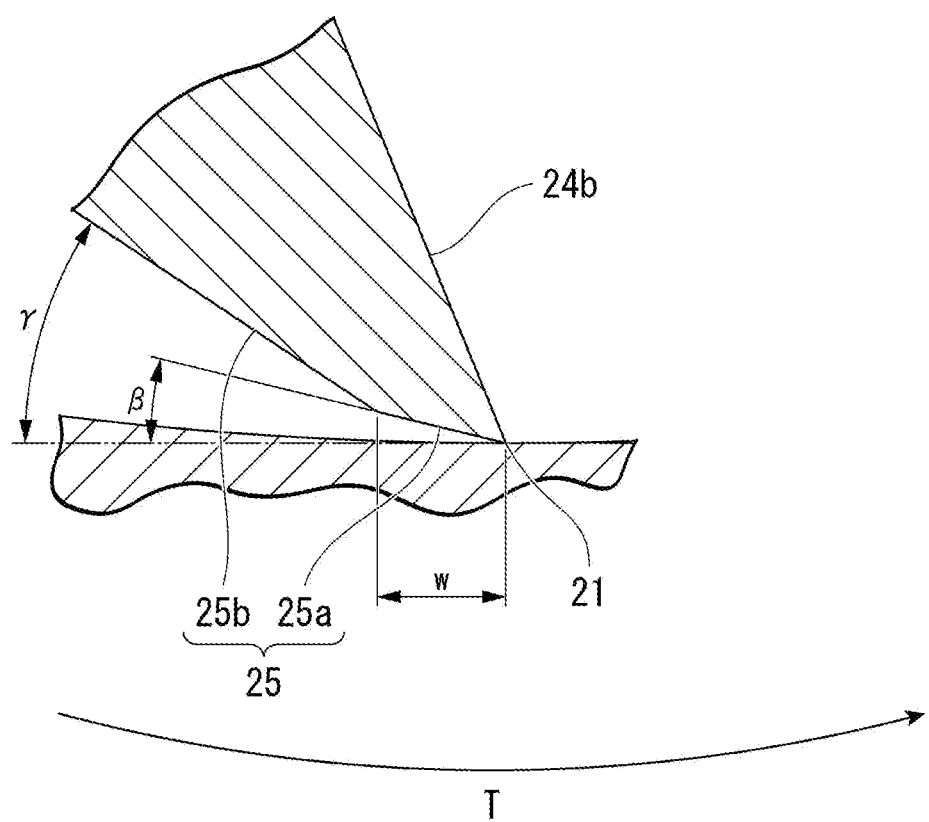
FIG. 4 is an enlarged sectional view of a peripheral cutting edge of the end mill according to the embodiment.

FIG. 4 is a schematic sectional view schematically showing an enlarged section orthogonal to the axis O of the peripheral cutting edge 21. Incidentally, FIG. 4 shows the workpiece cut by the peripheral cutting edge 21.

The peripheral cutting edge 21 of the present embodiment includes a two-stage flank face. Namely, the flank face 25 of the peripheral cutting edge 21 includes a first region 25a and a second region 25b that are arranged along the circumferential direction. The first region 25a is positioned on a peripheral cutting edge 21 side. In addition, the second region 25b is positioned on a chip discharge groove 24 side. Each of the first region 25a and the second region 26b has a circular shape in a cross-section of the end mill 1, which is eccentric with respect to an imaginary circle around the axis O. The first region 25a and the second region 25b have circular shapes of which the eccentricities differ from each other. In the flank face 25 of the peripheral cutting edge 21, for example, a flank angle $\beta$ of the first region 25a is 4°, and for example, a flank angle $\gamma$ of the second region 25b is 11°. Namely, the flank angle $\gamma$ of the second region 25b is larger than the flank angle $\beta$ of the first region 25a.

According to the present embodiment, since the peripheral cutting edge 21 includes a two-stage flank face, during cutting, a very small first-stage flank face (first region 25a) of the peripheral cutting edge 21 comes into contact with a machined surface to rub the machined surface of the workpiece. Accordingly, it is possible to smooth scratches and irregularities formed in the machined surface, and it is possible improve the accuracy of the machine surface.

The flank angle $\beta$ of the first-stage flank face (first region 25a) is preferably within a range of 1° to 10°, more preferably within a range of 4°±1°. When the angle of the first-stage flank face (first region 25a) is too small, the cutting resistance becomes high and the machined surface becomes rough, which is a problem. On the other hand, when the angle of the first-stage flank face (first region 25a) is too large, it is possible to reduce the cutting resistance; however, the effect of the first-stage flank face in rubbing the machined surface and smoothing the irregularities is reduced. When the flank angle $\beta$ of the first-stage flank face (first region 25a) is set within the foregoing range, it is possible to smooth the machined surface while reducing the cutting resistance, and it is possible to improve the dimensional accuracy of the machined surface.

Incidentally, in this specification, the flank angle of the flank face is measured in a cut face orthogonal to the axis O. In the measurement, firstly, an imaginary circle connecting distal ends of the peripheral cutting edges is obtained, and the angle of a flank face with respect to a tangent of the imaginary circle passing through the distal end of the peripheral cutting edge which is a measurement target is obtained.

In addition, a width w of the first-stage flank face (first region 25a) is preferably within a range of 0.01 mm to 0.15 mm, more preferably within a range of 0.03±0.01 mm. When the width w of the first-stage flank face (first region 25a) is set within the foregoing range, it is possible to reduce a contact area of the flank face 25 with respect to the workpiece, it is possible to smooth the machined surface while reducing the cutting resistance, and it is possible to improve the dimensional accuracy of the machined surface.

Incidentally, in this specification, the width w of the first-stage flank face (first region 25a) is measured in a cut face orthogonal to the axis O. In the measurement, firstly, an imaginary circle connecting distal ends of the peripheral cutting edges is obtained, and the length of the first region 25a in a tangential direction of the imaginary circle passing through the distal end of the peripheral cutting edge which is a measurement target is defined as the width w.

As shown in FIG. 4, the peripheral cutting edge 21 of the present embodiment includes the rake face 24b which is positive. Namely, when viewed from the axial direction, the rake face 24b extends from a cutting edge tip of the peripheral cutting edge 21 toward a side opposite to the tool rotation direction T with respect to a straight line connecting the cutting edge tip and the axis O. According to the present embodiment, since the peripheral cutting edge 21 includes the rake face 24b which is positive, the sharpness of the peripheral cutting edge 21 is further improved compared to when the peripheral cutting edge 21 includes a negative rake face. For this reason, it is possible to sufficiently improve the machining accuracy of the machined surface.

Figure 5A:
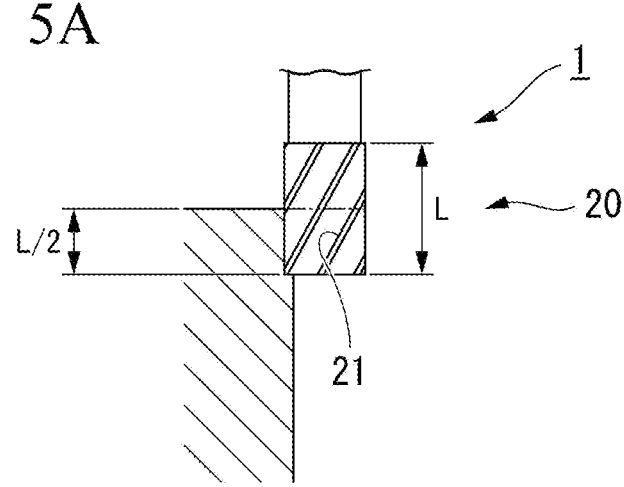
FIG. 5A is a view showing a procedure of contour machining of a wall surface using the end mill according to the embodiment, and shows an initial step of the contour machining.
Figure 5B:
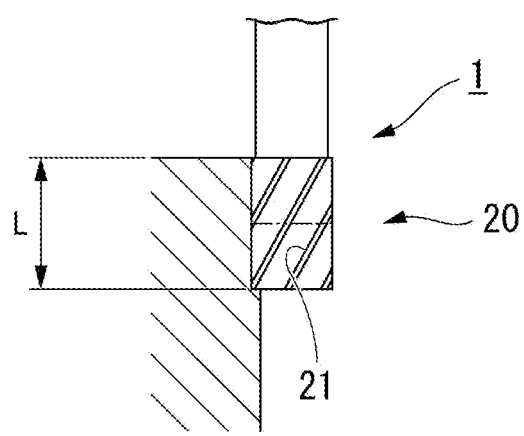
FIG. 5B is a view showing the procedure of the contour machining of the wall surface using the end mill according to the embodiment, and shows a step subsequent to that in FIG. 5A.
Figure 5C:
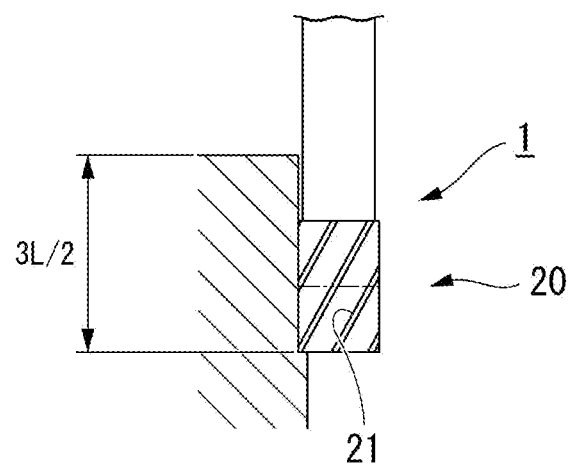
FIG. 5C is a view showing the procedure of the contour machining of the wall surface using the end mill according to the embodiment, and shows a step subsequent to that in FIG. 5B.

FIGS. 5A, 5B, and 5C are views showing a procedure of contour machining of a wall surface using the end mill 1. FIGS. 5A to 5C show each step of the contour machining. Incidentally, in FIGS. 5A to 5C, a cut length of the peripheral cutting edge 21 along the axial direction is L.

In the machining method of the present embodiment, the contour machining is performed in a state where a cut depth in a depth direction is set to be half the cut length L. In the contour machining by the end mill 1, the peripheral cutting edge 21 forms mainly a machined surface in a lower half region of the cut length L, and machines the machined surface again in an upper half region of the cut length L.

The outer diameter D of the peripheral cutting edge is uniform over the entire length of the peripheral cutting edge. For this reason, a machining allowance by the machining in the upper half region of the cut length L is very small.

Generally, in the contour machining using an end mill, a very small step is formed in a boundary portion of a cut in the depth direction due to bending of the end mill. According to the present embodiment, the machined surface formed by the lower half region of the peripheral cutting edge 21 is machined again in the upper half region. For this reason, a step formed in a boundary portion of the cut in the depth direction can be reduced by performing machining again in the upper half region of the cut length. As a result, it is possible to form the machined surface of which the machining accuracy is improved by the end mill 1.

Figure 6:
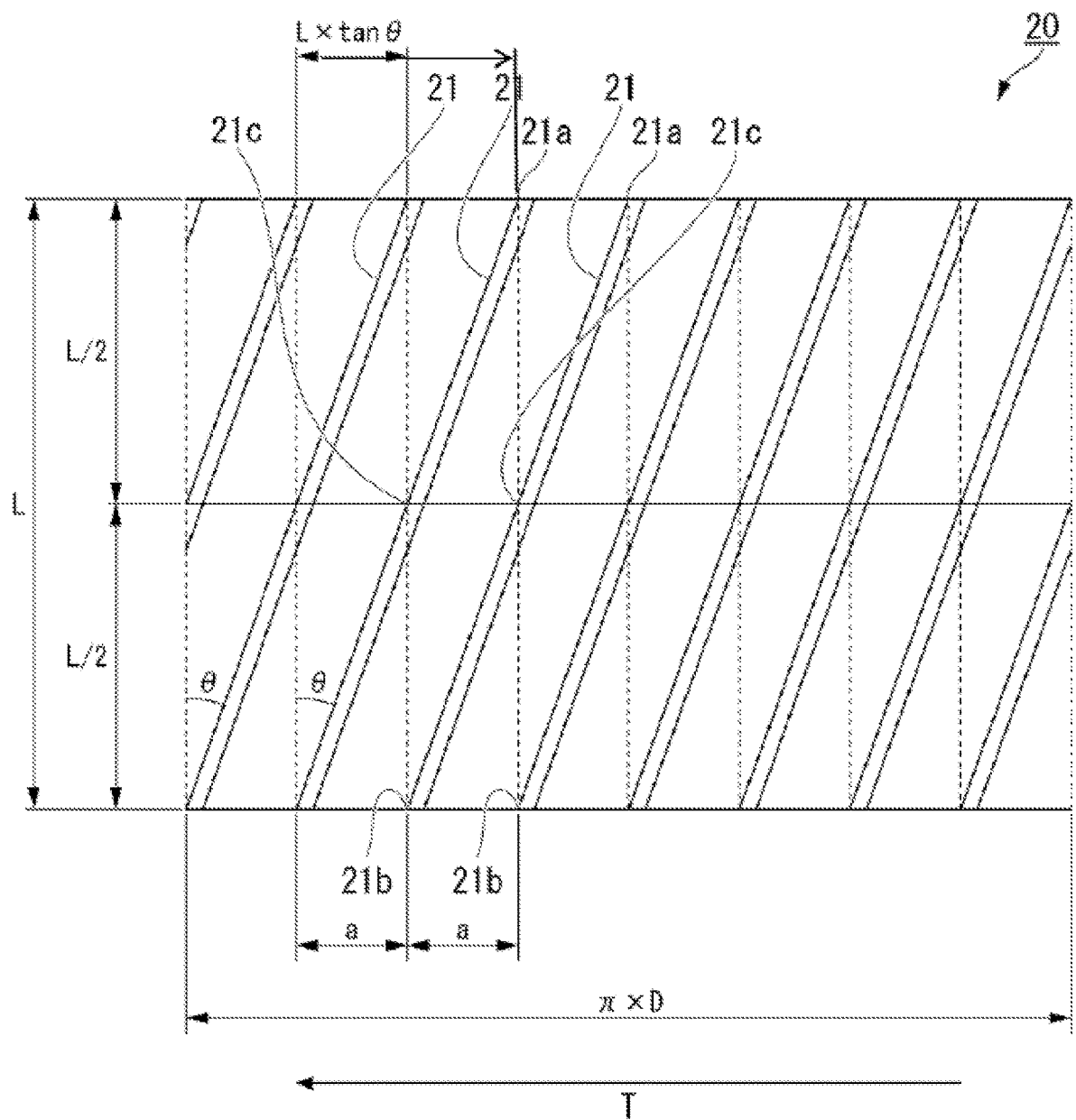
FIG. 6 is a schematic development view where the peripheral cutting edges according to the embodiment are developed along a circumferential direction.

FIG. 6 is a schematic development view where the peripheral cutting edges 21 of the cutting portion 20 are developed along the circumferential direction.

Here, in regard to one of the eight peripheral cutting edges 21, the cut length of the peripheral cutting edge 21 along the axial direction is L, the twist angle of the peripheral cutting edge 21 is θ, and a circumferential distance at a lower end 21b of the peripheral cutting edge 21 between the peripheral cutting edge 21 and another peripheral cutting edge 21 adjacent to the tool rotation direction rear side of the peripheral cutting edge 21 is a. Incidentally, the circumferential distance referred to here is the length of a circular arc extending around the axis O in the circumferential direction.

The cut length L of the peripheral cutting edge 21 along the axial direction is a substantially effective cut length of the peripheral cutting edge 21 that cuts a workpiece. Namely, the cut length L is a length of a region along the axial direction, which has the outer diameter D that is constant and is a larger diameter than that of the neck portion 11, in the peripheral cutting edge 21 helically extending along the axial direction. In addition, an upper end 21a of the peripheral cutting edge 21 is an upper end of a region where the outer diameter D is maintained in the peripheral cutting edge 21. Similarly, the lower end 21b of the peripheral cutting edge 21 is a lower end of the region where the outer diameter D is maintained in the peripheral cutting edge 21. Incidentally, since the end mill 1 of the present embodiment is a square end mill, the lower end 21b of the peripheral cutting edge 21 is a portion of connection to the bottom cutting edge 22. When the end mill 1 is a radius end mill, the lower end 21b of the peripheral cutting edge 21 is a portion of connection to a circular arc-shaped radius cutting edge.

In the present embodiment, in all of the peripheral cutting edges 21, the circumferential distance a between the peripheral cutting edge 21 and another peripheral cutting edge 21 adjacent to the tool rotation direction rear side thereof, and a=Dπ/8. Similarly, in the present embodiment, all of the peripheral cutting edges 21 have the same cut length L along the axial direction and the same twist angle θ of the peripheral cutting edge 21.

In the end mill 1 of the present embodiment, in a region of at least half (L/2) the cut length from the lower end 21b of the peripheral cutting edge 21, n expressed by the following (Equation 1) is approximately 1 for all of the eight peripheral cutting edges 21.

$$n = (L \times \tan \theta)/(2 \times a) \quad \text{(Equation 1)}$$

Here, attention is paid to a pair of the peripheral cutting edges 21 adjacent to each other in the circumferential direction. In the end mill 1 where n=1 in (Equation 1), a midpoint 21c of one peripheral cutting edge 21 in the axial direction on the tool rotation direction front side substantially coincides with the circumferential position of the lower end 21b of another peripheral cutting edge 21 adjacent to a tool rotation direction T rear side. The end mill 1 is rotated around the axis O to cut the workpiece using the cutting portion 20. In (Equation 1), in the end mill 1 where n=1, regardless of the phase of the cutting portion 20, any one peripheral cutting edge 21 of the eight peripheral cutting edges 21 always is in contact with the workpiece in the lower half region of the peripheral cutting edge 21.

Namely, the n expressed by the above equation indicates the number of the peripheral cutting edges 21, which are always in contact with the workpiece during the cutting of the workpiece by the end mill 1, in the lower half regions of the peripheral cutting edges 21. According to the present embodiment, during cutting, approximately one peripheral cutting edge 21 always is in contact with the workpiece in the lower half region of the peripheral cutting edge 21 (the number of the simultaneous contact cutting edges always is approximately 1 in the lower half region).

As described above, the end mill 1 of the present embodiment is configured to reproduce an especially good tool performance when the contour machining is performed in a state where the cut depth in the depth direction is set to be half the cut length L. Therefore, the lower half region of the peripheral cutting edge 21 has a large machining allowance, and thus the lower half region becomes a dominant factor to cause vibration, and it becomes crucial that the lower half region is configured to inhibit vibration.

During the cutting of the workpiece by the end mill 1, when the number of the simultaneous contact cutting edges increases or decreases in the lower half region, the cutting resistance which the end mill 1 receives from the workpiece increases or decreases. More specifically, when the lower half region of the peripheral cutting edge 21 separates from the workpiece, the cutting resistance decreases sharply, and when the peripheral cutting edge 21 starts to come into contact with the workpiece, the cutting resistance increases sharply. Accordingly, the end mill vibrates to cause a reduction in machining accuracy, which is a problem. In addition, also when the number of the simultaneous contact cutting edges always is a natural number of two or greater in the lower half region, the machining accuracy is further reduced compared to when the number of the simultaneous contact cutting edges always is approximately 1.

According to the present embodiment, since the number of the simultaneous contact cutting edges always is approximately 1 in the lower half region, when one peripheral cutting edge 21 separates from the work, another peripheral cutting edge 21 starts to come into contact with the workpiece substantially at the same time. Therefore, it is possible to inhibit the vibration of the end mill 1 during machining, and to improve the machining accuracy of the machined surface.

In addition, it is possible to secure a long cut length of the peripheral cutting edge 21 in the axial direction while satisfying the foregoing configuration, and it is possible to perform machining over a wide range in one step when the contour machining is performed. As a result, it is possible to reduce the machining cost.

In the end mill 1 of the present embodiment, the n expressed by the above (Equation 1) is preferably from 0.9 to 1.1. As described above, when the number of the simultaneous contact cutting edges always is approximately 1 in the lower half region (namely, n≈1), it is possible to maximize the machining accuracy of the machined surface. On the other hand, when the n exceeds 1.1 or when the n is less than 0.9, the vibration of the end mill 1 during machining adversely affects the machining accuracy, and it is difficult to form the machined surface with sufficient machining accuracy. Namely, when the n is set to be from 0.9 to 1.1, it is possible to sufficiently improve the machining accuracy of the machined surface. In addition, the n is more preferably from 0.95 to 1.05. When the n is set to be from 0.95 to 1.05, it is possible to more effectively inhibit the vibration of the end mill 1.

In addition, in the end mill 1, m expressed by the following (Equation 2) over the entire length of the peripheral cutting edge 21 is approximately 2 for all of the eight peripheral cutting edges 21.

$$m = (L \times \tan \theta)/a \qquad \text{(Equation 2)}$$

The m expressed by (Equation 2) indicates the number of the peripheral cutting edges 21, which always are in contact with the workpiece during the cutting of the workpiece by the end mill 1, over the entire length of the peripheral cutting edge 21. With such a configuration, in the contour machining where the cut depth in the depth direction is half the entire length of the peripheral cutting edge 21, it is possible to form mainly the machined surface in the lower half region of the cut length L, and then to machine the machined surface again in the upper half region of the cut length L. In contour machining using an end mill in the related art, a very small step is formed in a boundary portion of a cut in the depth direction due to the bending of the end mill. According to the foregoing configuration, the cut length and the simultaneous contact cutting edges are the same between a lower half and an upper half of the cut length L. For this reason, it is possible to further improve the machining accuracy of the machined surface, and it is also possible to further reduce the step formed in the boundary portion of the cut in the depth direction.

In the end mill 1 of the present embodiment, the m expressed by the above (Equation 2) is preferably from 1.9 to 2.1. As described above, when the number of the simultaneous contact cutting edges always is approximately 2 over the entire length of the peripheral cutting edge 21 (namely, m≈2), it is possible to improve the machining accuracy of the machined surface. On the other hand, when the m exceeds 2.1 or when the m is less than 1.9, the vibration of the end mill 1 during machining adversely affects the machining accuracy, and it is difficult to form the machined surface with sufficient machining accuracy. Namely, according to the foregoing configuration, it is possible to sufficiently improve the machining accuracy of the machined surface. In addition, the m is more preferably from 1.95 to 2.05. When then is set to be from 1.95 to 2.05, it is possible to more effectively inhibit the vibration of the end mill 1.

In addition, according to the present embodiment, the cutting portion 20 is provided with the eight peripheral cutting edges 21. When the number of the simultaneous contact cutting edges always is approximately 1 in the lower half region of the peripheral cutting edge 21 and the number of the peripheral cutting edges 21 is increased, it is possible to inhibit the margin of an increase or a decrease in cutting resistance when the peripheral cutting edge 21 in contact with the workpiece is changed. Since the eight peripheral cutting edges 21 are provided, it is possible to reduce the margin of an increase or a decrease in cutting resistance, and to inhibit the vibration of the end mill 1 during cutting. As a result, it is possible to improve the machining accuracy.

In the end mill 1, the outer diameter D of the peripheral cutting edge 21 is preferably 4 mm or greater. When the outer diameter D of the peripheral cutting edge 21 is small, it is difficult to form eight cutting edges. For this reason, in the end mill 1 of the present embodiment which is assumed to include eight cutting edges, the outer diameter D of the peripheral cutting edge 21 is preferably 4 mm or greater. Furthermore, the outer diameter D of the peripheral cutting edge 21 is preferably 5 mm or greater. In addition, when the outer diameter D is too large, it is difficult to produce a solid end mill. For this reason, the outer diameter D of the peripheral cutting edge 21 is preferably 30 mm or less.

In order to increase the rigidity of the end mill 1 and thus sufficiently improve the machining accuracy, it is preferable that the web thickness of the end mill 1 in a cross-section orthogonal to the axis O in a portion where the peripheral cutting edge 21 is formed is from 75% to 85% of the outer diameter D of the peripheral cutting edge 21 in the same cross-section. In addition, in order to increase the rigidity of the end mill 1 and thus sufficiently improve the machining accuracy, the cut length L of the peripheral cutting edge 21 is preferably 1.5 times or less the outer dimension D of the peripheral cutting edge 21, more preferably 1.2 times or less.

In the end mill 1, the twist angle θ is preferably from 35° to 40°. When the twist angle θ of the peripheral cutting edge 21 is from 35° to 40°, in the end mill 1 including the eight peripheral cutting edges 21 in which the simultaneous contact cutting edges always is approximately 1 in the lower half region of the peripheral cutting edge, the peripheral cutting edge 21 is configured such that the cut length L is not too long. Therefore, the rigidity of the end mill 1 is increased and the deflection of the end mill 1 is less likely to occur during machining. Accordingly, it is possible to sufficiently improve the machining accuracy of the machined surface without performing zero cutting. For the same reason, the twist angle of the peripheral cutting edge 21 is preferably from 37° to 39°.

EXAMPLES

Hereinafter, the present invention will be described in more detail with reference to examples; however, the present invention is not limited to these examples.

(Test 1)

Cutting tests in the finishing process of vertical walls in Test example 1-1, Test example 1-2, Test example 1-3, Test example 1-4, and Test example 1-5 were performed under the following conditions.

Workpiece: DAC (H) 48 HRC

End mill: outer diameter of peripheral cutting edge=Φ6 mm and web thickness=80%

Machine: MAKINO V33 (HSK-F63)

Cutting conditions: rotation speed n=2,650 rotations per minute

Feed speed Vf=636 mm/min

Machining allowance 0.1 mm

Machining depth 40 mm

Down cut

Dry air blow machining

An end mill used in Test example 1-1 was an end mill where the simultaneous contact cutting edges were approximately 1 in the lower half region of the peripheral cutting edge. Then, contour machining was performed in a state where a cut depth in the depth direction was set to be half the cut length of the peripheral cutting edge. Therefore, in Test example 1-1, a machined surface cut by the lower half of the peripheral cutting edge was machined again by the upper half of the peripheral cutting edge. Namely, in Test example 1-1, cutting was performed in each step such that the number of the simultaneous contact cutting edges always were approximately 1 in the lower half region and the upper half region of the peripheral cutting edge.

In the end mill used in Test example 1-1, the peripheral cutting edge has a cut length of 6 mm.

The peripheral cutting edge of the end mill used in Test example 1-1 includes a two-stage flank face.

The end mill used in Test example 1-1 includes eight peripheral cutting edges which have an equal lead and a twist angle of 38°.

In the end mill used in Test example 1-1, the rake angle of the peripheral cutting edge is positive.

In an end mill used in Test example 1-2, the cut length of the peripheral cutting edge was half the cut length of the peripheral cutting edge of the end mill used in Test example 1-1. Then, in Test example 1-2, contour machining was performed in a state where a cut depth in the depth direction was set to be the entire cut length of the peripheral cutting edge. Namely, in Test example 1-2, cutting was performed in each step such that the number of the simultaneous contact cutting edges always was approximately 1 over the entire cut length.

In the end mill used in Test example 1-2, the peripheral cutting edge has a cut length of 3 mm.

The peripheral cutting edge of the end mill used in Test example 1-2 has a two-stage flank face.

The end mill used for Test example 1-2 has eight peripheral cutting edges which have an equal lead and a twist angle of 38°.

In the end mill used in Test example 1-2, the rake angle of the peripheral cutting edge is positive.

In an end mill used in Test example 1-3, the cut length was two times the cut length of the peripheral cutting edge of the end mill used in Test example 1-1, and the number of the simultaneous contact cutting edges was approximately 2 in the lower half region of the peripheral cutting edge. Then, contour machining was performed in a state where a cut depth in the depth direction was set to be half the cut length of the peripheral cutting edge. Namely, in Test example 1-3, cutting was performed in each step such that the number of the simultaneous contact cutting edges always was approximately 2.

In the end mill used in Test example 1-3, the peripheral cutting edge has a cut length of 12 mm.

The peripheral cutting edge of the end mill used in Test example 1-3 has a two-stage flank face.

The end mill used for Test example 1-3 has eight peripheral cutting edges which have an equal lead and a twist angle of 38°.

In the end mill used in Test example 1-3, the rake angle of the peripheral cutting edge is positive.

An end mill used in Test example 1-4 had a configuration where the cut length of the peripheral cutting edge was shortened similar to Test example 1-2 and the peripheral cutting edge included a single-stage flank face. Then, in Test example 1-4, contour machining was performed in a state where a cut depth in the depth direction was set to be the entire cut length of the peripheral cutting edge. Namely, the contour machining was performed such that the number of the simultaneous contact cutting edges was approximately 1 over the entire cut length.

However, the peripheral cutting edge of the end mill used in Test example 1-4 includes a single-stage flank face.

In the end mill used in Test example 1-4, the peripheral cutting edge has a cut length of 3 mm.

The end mill used for Test example 1-4 has eight peripheral cutting edges which have an equal lead and a twist angle of 38°.

In the end mill used in Test example 1-4, the rake angle of the peripheral cutting edge is positive.

An end mill used in Test example 1-5 had a different twist angle from that of the end mill used in Test example 1-1. Then, in Test example 1-5, contour machining was performed in a state where a cut depth in the depth direction was set to be the entire cut length of the peripheral cutting edge. Namely, the contour machining was performed such that the number of the simultaneous contact cutting edges always was approximately 1 over the entire cut length.

In the end mill used in Test example 1-5, the peripheral cutting edge has a cut length of 6 mm.

The peripheral cutting edge of the end mill used in Test example 1-5 has a two-stage flank face.

The end mill used in Test example 1-5 includes eight peripheral cutting edges which have an equal lead and a twist angle of 21°.

In the end mill used in Test example 1-5, the rake angle of the peripheral cutting edge is positive.

Figure 7:
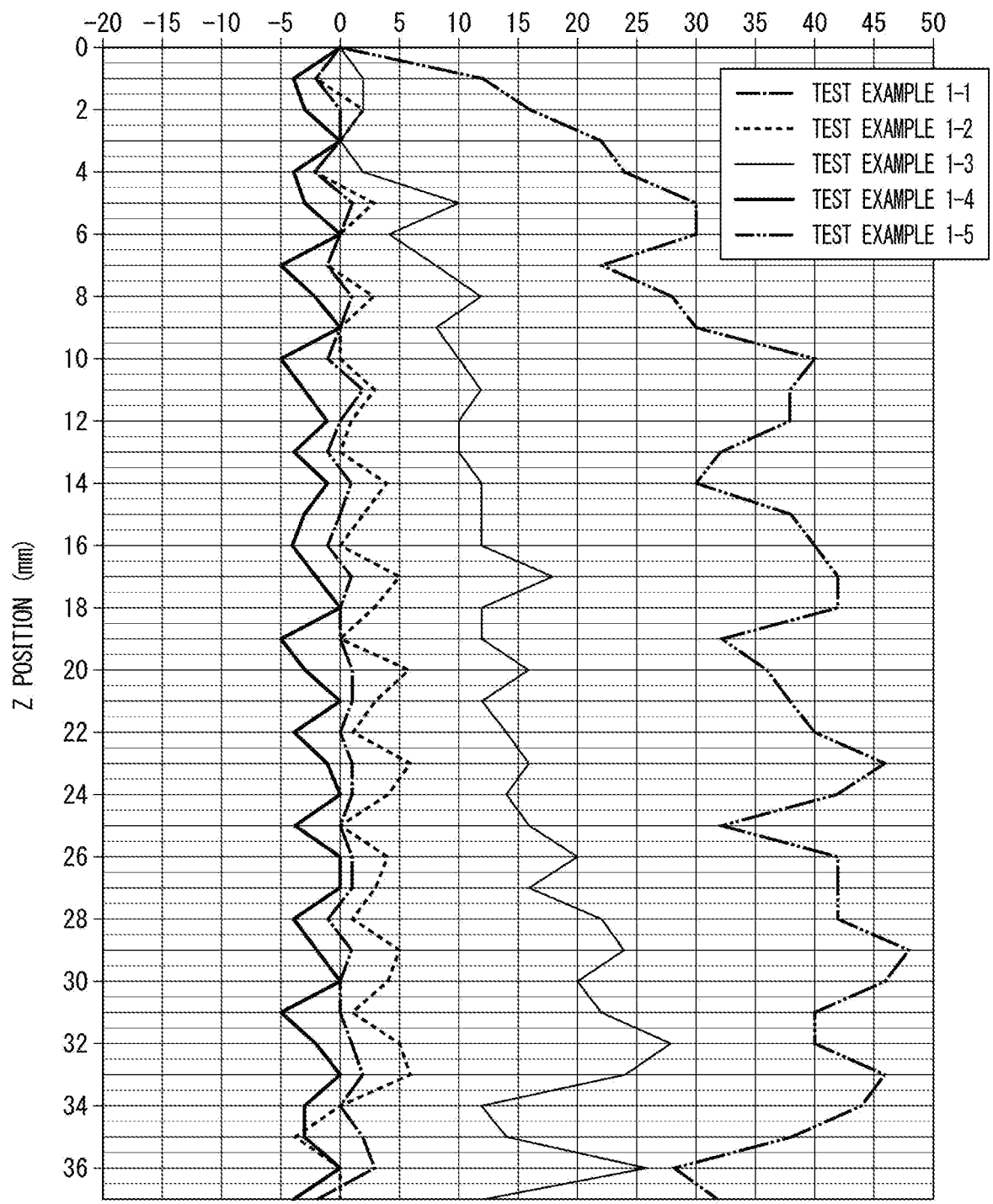
FIG. 7 is a graph showing a relationship between the depth of a machined surface and a measurement result of the deflection amount of the machined surface in cutting tests of Test example 1-1, Test example 1-2, Test example 1-3, Test example 1-4, and Test example 1-5.

FIG. 7 is a graph showing a relationship between the depth of a machined surface and a measurement result of the deflection amount of the machined surface in the cutting tests of Test example 1-1, Test example 1-2, Test example 1-3, Test example 1-4, and Test example 1-5. As shown in FIG. 7, in Test example 1-1, it can be confirmed that the deflection amount is sufficiently smaller compared to the other test examples.

The following Table 1 shows evaluation results of the machined surfaces formed in the cutting tests of Test example 1-1, Test example 1-2, Test example 1-3, Test example 1-4, and Test example 1-5.

In Table 1, "Ra" is an arithmetic mean roughness of the machined surface and "Rz" is the maximum height of the machined surface. In addition, the "appearance and glossiness" is a result of visual evaluation of the machined surface. The "machining streaks" are a result of visual evaluation of the state of streaks that are formed at equal intervals due to each step of feeding in the depth direction. The "deflection accuracy" is an evaluation result based on the graph shown in FIG. 7. The cutting resistance is a result evaluated based on a measurement result of a cutting resistance. Incidentally, in each item, A indicates the best state, B indicates the next best state, C indicates a further next best state, and D indicates an unfavorable state.

TABLE 1

| | Evaluation of cut surface | | | | | |
|---|---|---|---|---|---|---|
| | Surface properties | | | | | |
| | Ra ($\mu$m) | Rz ($\mu$m) | Appearance and glossiness | Machining streak | Deflection accuracy | Cutting resistance |
| Test example 1-1 | 0.072 | 0.399 | A | B | A | B |
| Test example 1-2 | 0.066 | 0.442 | A | C | B | B |
| Test example 1-3 | 0.127 | 0.701 | B | D | D | C |
| Test example 1-4 | 0.139 | 0.85 | D | D | B | A |
| Test example 1-5 | 0.56 | 3.378 | D | D | D | D |

From the results shown in Table 1, it can be confirmed that the machined surface in Test example 1-1 is the best compared to the machined surfaces in the other test examples.

In Test example 1-1, both of the deflection accuracy and the surface properties are good and zero cutting for correction is not required. In Test examples 1-3 and 1-5 where the cut depth is large, the deflection accuracy is poor and a residual cut amount of approximately 10 μm is confirmed even when zero cutting is performed 5 to 10 times as an additional step. In Test examples 1-2 and 1-4, the deflection accuracy is 5 μm or less; however, the surface properties are worse than those in Test example 1-1.

(Test 2)

Subsequently, Test 2 which exhibits the advantage of setting the number of the peripheral cutting edges to eight will be described.

Cutting tests of Test example 2-1 and Test example 2-2 are performed under the following conditions.

Workpiece: DAC (H) 48 HRC
End mill: outer diameter of peripheral cutting edge=Φ6 mm
Machine: MAKINO V33 (HSK-F63)
Cutting conditions: rotation speed n=2,650 rotations per minute
Feed speed Vf=636 mm/min
Machining allowance 0.1 mm
Down cut
Dry air blow machining An end mill used in Test example 2-1 includes eight peripheral cutting edges which have an equal lead, and the twist angle of the peripheral cutting edge is 38°. The end mill used in Test example 2-1 is an end mill having the same configuration as that of the end mill in Test example 1-1.

On the other hand, an end mill used in Test example 2-2 includes two peripheral cutting edges which have an equal lead, and the twist angle of the peripheral cutting edge is 72°. Other configurations of the end mill used in Test example 2-2 are the same as those of the end mill in Test example 2-1.

In Test examples 2-1 and 2-2, in contour machining, a change over time in cutting resistance in a step of cutting using only the lower half region of the peripheral cutting edge (namely, the step shown in FIG. 5A) was measured.

Figure 8A:
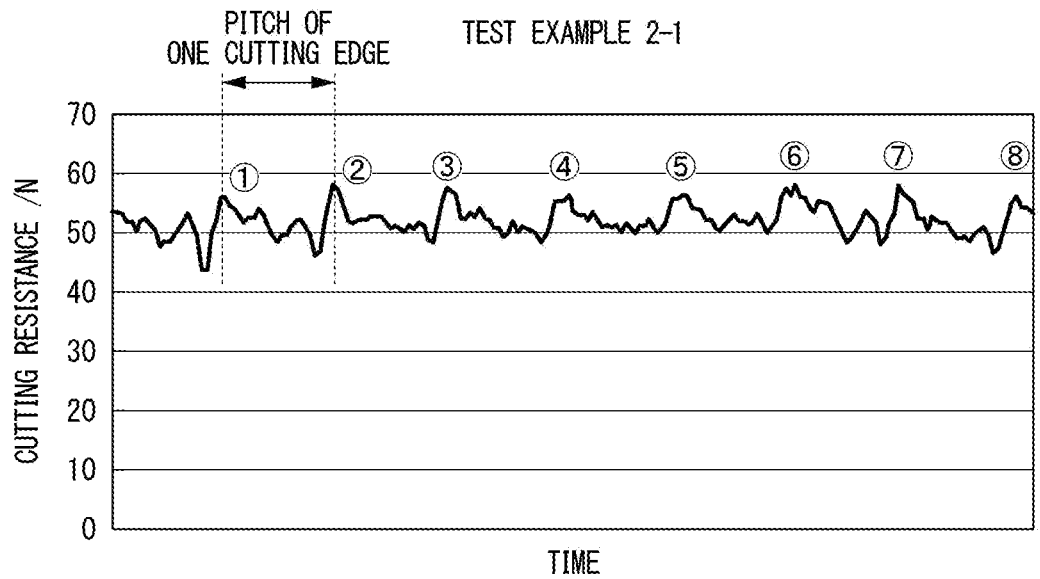
FIG. 8A is a graph showing a change over time in cutting resistance in a cutting test of Test example 2-1.
Figure 8B:
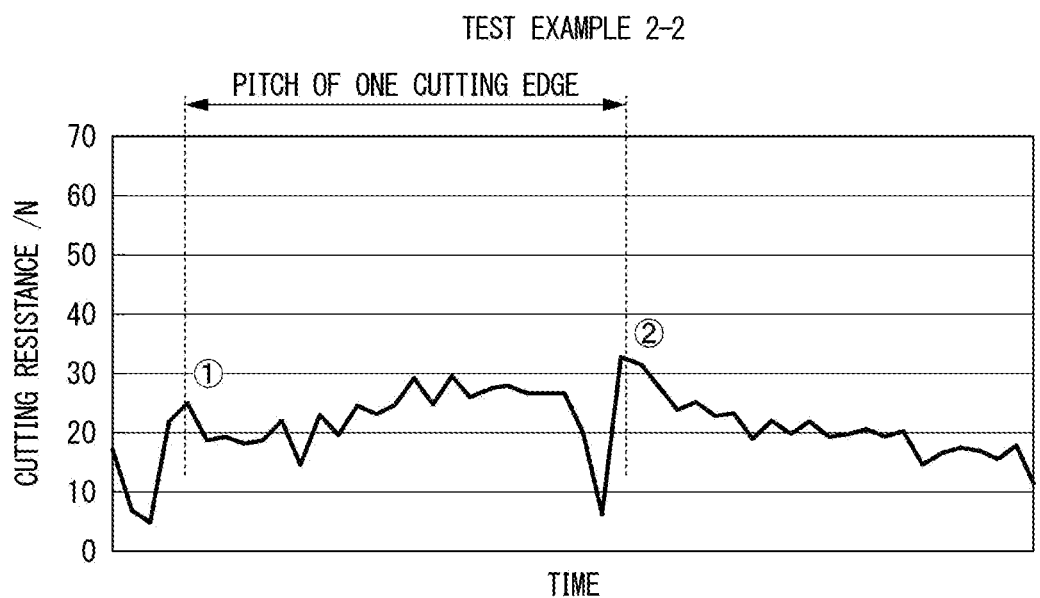
FIG. 8B is a graph showing a change over time in cutting resistance in a cutting test of Test example 2-2.

FIG. 8A is a graph showing a change over time in cutting resistance in the cutting test of Test example 2-1. FIG. 8B is a graph showing a change over time in cutting resistance in the cutting test of Test example 2-2. In FIGS. 8A and 8B, the horizontal axis indicates the time and the vertical axis indicates the cutting resistance. In FIGS. 8A and 8B, the scale on the horizontal axis is the same. Incidentally, in the graphs shown in FIGS. 8A and 8B, numbers are assigned to points where the peripheral cutting edges arranged in the circumferential direction start to come into contact with the machined surface.

As shown in FIGS. 8A and 8B, in Test examples 2-1 and 2-2, the cutting resistance increases at the moment when one peripheral cutting edge separated from a workpiece and another peripheral cutting edge starts to come into contact with the workpiece. In regard to the absolute value of the cutting resistance, the absolute value of the cutting resistance in Test example 2-1 is larger than the absolute value of the cutting resistance in Test example 2-2. The reason is considered that the end mill of Test example 2-1 has a smaller twist angle than that of the end mill of Test example 2-2. However, in regard to the margin of an increase or a decrease in cutting resistance, the margin of an increase or a decrease in cutting resistance in Test example 2-1 is smaller than the margin of an increase or a decrease in cutting resistance in Test example 2-2. When the margin in an increase or a decrease in cutting resistance is large, due to the increase or decrease in cutting resistance, the end mill vibrates to cause a reduction in machining accuracy. Namely, since the end mill including the eight peripheral cutting edges is used in Test example 2-1, it is possible to further improve the accuracy of the machined surface compared to the end mill using the two peripheral cutting edges (the end mill of Test example 2-2).

The embodiment of the present invention has been described above; however, the configurations and the combination thereof in the embodiment are merely examples, and additions, omissions, substitutions, and other changes of configuration can be made without departing from the concept of the present invention. In addition, the present invention is not limited by the embodiment.

REFERENCE SIGNS LIST

1 End mill
11 Neck portion (shaft portion)
20 Cutting portion
21 Peripheral cutting edge
21b Lower end
22 Bottom cutting edge
24b Rake face
25 Flank face
a Circumferential distance
d, D Outer diameter
L Cut length
O Axis (central axis)
T Tool rotation direction
θ Twist angle

What is claimed is:

1. An end mill comprising:
a shaft portion having a columnar shape and extending along a central axis; and
a cutting portion positioned on a distal end side of the shaft portion,
wherein eight peripheral cutting edges having a larger outer diameter than that of the shaft portion are provided in the cutting portion in a circumferential direction,
each of the peripheral cutting edges is a twisted cutting edge extending helically around the central axis,
in regard to one peripheral cutting edge of the eight peripheral cutting edges, when a cut length of the peripheral cutting edges along an axial direction is L, a twist angle of the twisted cutting edge is θ, and a circumferential distance at a lower end of the peripheral cutting edges between the one peripheral cutting edge and another peripheral cutting edge adjacent to a tool rotation direction rear side of the one peripheral cutting edge is a, n expressed by the following equation is from 0.9 to 1.1 for all of the eight peripheral cutting edges in at least a half region of the cut length from the lower end of the peripheral cutting edges,
the twist angle is from 35° to 40°, $$n = (L \times \tan\theta)/(2 \times a),$$

a value obtained from $L \times \tan\theta$ corresponds to a circumferential width occupied by each of the peripheral cutting edges and has a unit of length, a value obtained from 2×a corresponds to a double length of a and has a unit of length, and n is a ratio of the circumferential width occupied by each of the cutting peripheral cutting edges and the double length of a and is a dimensionless quantity.

2. The end mill according to claim 1,
wherein m expressed by the following equation is from 1.9 to 2.1 for all of the eight peripheral cutting edges in an entire length of the peripheral cutting edge $$m=(L\times\tan\theta)/a,$$

m is a ratio of the circumferential width occupied by each of the cutting peripheral cutting edges and a, and is a dimensionless quantity.

3. The end mill according to claim 1,
wherein an outer diameter of each of the peripheral cutting edges is 4 mm or greater.

4. The end mill according to claim 1,
wherein each of the peripheral cutting edges includes a positive rake face.

5. The end mill according to claim 1,
wherein each of the peripheral cutting edges includes a two-stage flank face.

6. The end mill according to claim 1,
wherein in addition to being provided with the eight peripheral cutting edges, the cutting portion is provided with eight bottom cutting edges that are provided at distal ends of the cutting portion to extend outward from a central axis side in a radial direction, and eight radius cutting edges that smoothly connect the peripheral cutting edges and the bottom cutting edges, and a distal most point of the cutting portion is positioned at the radius cutting edges between a boundary between each of radius cutting edges and each of the peripheral cutting edges and a boundary between each of the radius cutting edges and each of the bottom cutting edges.

7. The end mill according to claim 1,
wherein contour machining is performed in a state where a cut depth in a depth direction is set to be half the cut length.

8. A machining method using the end mill according to claim 1, comprising:
performing contour machining in a state where a cut depth in a depth direction is set to be half the cut length.

9. The end mill according to claim 1,
wherein the outer diameter of each of the peripheral cutting edges is 30 mm or less.

10. The end mill according to claim 1,
wherein a web thickness of the end mill in a cross-section orthogonal to the axis in a portion where the peripheral cutting edges are formed is from 75% to 85% of the outer diameter of the peripheral cutting edges in the cross-section.

11. The end mill according to claim 1,
wherein the cut length L of the peripheral cutting edges is 1.5 times or less the outer diameter of the peripheral cutting edges.

12. The end mill according to claim 1,
wherein the twist angle is from 37° to 39°.

* * * * *